3,288,847
PREPARATION OF 1,4-CYCLOHEXADIENE-1-CARBOXYLIC ACID
Lawrence J. Hughes, Hitchcock, and William F. Yates, Dickinson, Tex., assignors to Monsanto Company, St. Louis, Mo., a corporation of Delaware
No Drawing. Filed Apr. 13, 1964, Ser. No. 359,421
7 Claims. (Cl. 260—514)

The present invention relates to a novel method for the preparation of 1,4-cyclohexadiene-1-carboxylic acid or, as it is sometimes called, 2,5-dihydrobenzoic acid.

Several methods are to be found in the literature for the preparation of 1,4-cyclohexadiene-1-carboxylic acid. Probably the best known is that which involves the condensation of butadiene with propiolic acid. This method, however, suffers from some disadvantages with respect to practical exploitation in that propiolic acid as a raw material is not readily available and inordinately long reaction times are required for the condensation in order to obtain satisfactory yields. It is, accordingly, an object of the present invention to provide a method for the preparation of 1,4-cyclohexadiene-1-carboxylic acid which is not characterized by such disadvantages. This and other objects and advantages of the invention will be apparent from the following detailed description thereof.

1,4-cyclohexadiene-1-carboxylic acid is prepared according to the present invention by decarboxylation of a compound of the formula

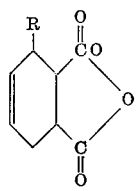

wherein R is a radical known to form quite negative ions and is chosen from the group consisting of halo, acetoxy, benzyloxy and tosyl radicals. The decarboxylation is effected with a strong base followed by acidification of the reaction mixture from which the free acid can then be recovered by conventional techniques of filtration, crystallization, and recrystallization from water to obtain the pure acid.

Suitable starting materials for the process of the invention include such compounds as 3-chloro-4-cyclohexene-1,2-dicarboxylic acid anhydride, 3-acetoxy-4-cyclohexene-1,2-dicarboxylic acid anhydride, 3-bromo-4-cyclohexene-1,2-dicarboxylic acid anhydride, 3-benzyloxy-4-cyclohexene-1,2-dicarboxylic acid anhydride, 3-fluoro-4-cyclohexene-1,2-dicarboxylic acid anhydride, 3-tosyl-4-cyclohexene-1,2-dicarboxylic acid anhydride and 3-iodo-4-cyclohexene-1,2-dicarboxylic acid anhydride. These compounds are adducts readily obtained by reacting the corresponding trans 1-substituted butadiene with maleic anhydride according to the Diels-Alder synthesis in a manner well known to the art. For example, 3-chloro-4-cyclohexene-1,2-dicarboxylic acid anhydride is obtained as described by Onishchenko and Aronova in Doklady Akademii Nauk SSSR, vol. 132, No. 1, pp. 138–40 (1960) by reacting trans 1-chlorobutadiene with maleic anhydride at a temperature from about 50 to about 55° C. Likewise, 3-acetoxy-4-cyclohexene-1,2-dicarboxylic acid anhydride can be prepared by the reaction of trans 1-acetoxybutadiene with maleic anhydride as described in J. Org. Chem. 21, 328–31 (1956).

Any strong base may be used to decarboxylate the adduct starting materials. Suitable bases, for example, are the alkali metal hydroxides such as sodium hydroxide, potassium hydroxide and the like; alkaline earth metal hydroxides such as calcium hydroxide, barium hydroxide and the like; organic bases such as trimethylbenzylammonium hydroxide and the like. At least four equivalents of the base are required per mole of the adduct starting material to effect the reaction. However, an excess of the base can be used if desired to function as a reaction medium.

The decarboxylation reaction can be carried out at any temperature within the range from about 30° C. to about 100° C. Preferably, the reaction temperature is maintained in the range from about 50° C. to 70° C.

Following completion of the decarboxylation reaction, the reaction mixture is acidified by the addition of a mineral acid such as phosphoric acid, hydrochloric acid, sulfuric acid, or the like to neutralize any excess base present in the mixture and convert the salt product to the free acid form. At least three equivalents of acid per mole of the adduct starting material are required in order to obtain the acid product. If excess base is employed in the decarboxylation step, additional acid in the amount necessary to neutralize the excess alkaline agent must be used. During the acidification step, carbon dioxide is boiled out of the reaction mixture. The reaction mixture is then cooled and the product 1,4-cyclohexadiene-1-carboxylic acid is separated out in crystalline form. After filtration, the product may be purified by recrystallization from water or any other suitable solvent.

The following examples are presented to illustrate the invention but are not to be construed as limiting it in any manner whatsoever.

*Example 1*

Three samples of 3-chloro-4-cyclohexene-1,2-dicarboxylic acid anhydride weighing 0.2540 g., 0.2363 g. and 0.2243 g., respectively, were placed in separate flasks and each was diluted with 50 ml. of water and 55 ml. of standard sodium hydroxide solution (0.0989 molar). The flasks were gently warmed to effect solution which occurred in a few minutes. Each of the samples was then titrated with standard hydrochloric acid (0.1015 molar) in 1-ml. increments and the pH of the solutions was recorded by means of a Beckman meter and glass electrodes. Two distinct pH breaks were noted on each sample. Plots of the titration were made and calculations based on the data indicated that 55 to 61% of the adduct was the exo form and thus subject to decarboxylation.

All the samples were then combined, made alkaline with potassium hydroxide and boiled on a hot plate down to a volume of about 25–50 ml. The mixture was then acidified with hydrochloric acid to a pH of 2 and a precipitate was formed. Extraction with ether three times completely removed the solid from the mixture. Evaporation of the ether yielded a solid product which on partial sublimation gave beautiful white needles having a melting point of 98–113° C. This product was identified as 1,4-cyclohexadiene-1-carboxylic acid by means of its infrared spectrum. Recrystallization of the product from water gave a melting point of 121–123° C. as compared with the literature value for this compound of 121–122° C. The average molecular weight was determined to be 123 as compared to the theoretical value of 124. Elemental analysis of the acid product was follows:

| | Percent C | Percent H | Percent O (Diff.) |
|---|---|---|---|
| Average Found | 67.74<br>67.90<br>67.82 | 6.53<br>6.68<br>6.60 | 25.58 |
| Theoretical | 67.7 | 6.45 | 25.8 |

Example II

A mixture of 4 ml. of 1-chlorobutadiene (65% trans isomer) and 2 g. (0.02 mole) of maleic anhydride was heated under reflux conditions (50 to 70° C.) for about 30 minutes. The mixture was cooled and poured into a solution of 4 g. of sodium hydroxide in about 100 ml. of water. The resulting mixture was heated to about 80° C. with stirring and then filtered. The filtrate was acidified with 10 ml. of concentrated HCl. After the evolution of carbon dioxide ceased, the reaction mixture was cooled to 0° C. for about one hour to effect crystallization. The crystals obtained were separated by filtering and dried. These, in the form of white plates (0.58 g.), were recrystallized from 50 ml. of water and the purified product was identified as 1,4-cyclohexadiene-1-carboxylic acid by means of infrared and nuclear magnetic resonance (NMR) analyses.

What is claimed is:

1. The method of preparing 1,4-cyclohexadiene-1-carboxylic acid which comprises reacting a compound of the formula

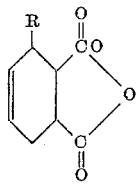

wherein R is chosen from the group consisting of halo, acetoxy, benzyloxy and tosyl radicals, with at least 4 equivalents of a strong base per mole of said compound, acidifying the resultant reaction mixture, and recovering 1,4-cyclohexadiene-1-carboxylic acid therefrom.

2. The method of claim 1 wherein said reaction is conducted at a tempearture from about 30° C. to about 100° C.

3. The method of preparing 1,4-cyclohexadiene-1-carboxylic acid which comprises reacting 1-chloro-4-cyclohexene-1,2-dicarboxylic acid anhydride with at least 4 equivalents of a strong base per mole of said anhydride, acidifying the resulting reaction mixture with a mineral acid, and recovering 1,4-cyclohexadiene-1-carboxylic acid therefrom.

4. The method of claim 3 wherein said strong base is an alkali metal hydroxide.

5. The method of claim 4 wherein the reaction with the alkali metal hydroxide is conducted at a temperature within the range from about 30 to about 100° C.

6. The method of claim 5 wherein said reaction mixture is acidified with hydrochloric acid.

7. The method of preparing 1,4-cyclohexadiene-1-carboxylic acid which comprises reacting 1-chloro-4-cyclohexene-1,2-dicarboxylic acid anhydride with at least 4 equivalents of sodium hydroxide per mole of said anhydride at a temperature within the range from about 50° C. to about 70° C., acidifying the resultant reaction mixture with hydrochloric acid, and recovering 1,4-cyclohexadiene-1-carboxylic acid therefrom.

References Cited by the Examiner
FOREIGN PATENTS
1,007,828  10/1965  Great Britain.

OTHER REFERENCES
Gould, "Mechanism and Structure in Org. Chem." (1959), pp. 346–353.

LORRAINE A. WEINBERGER, *Primary Examiner.*

R. K. JACKSON, *Assistant Examiner.*

UNITED STATES PATENT OFFICE
CERTIFICATE OF CORRECTION

Patent No. 3,288,847                        November 29, 1966

Lawrence J. Hughes et al.

It is hereby certified that error appears in the above numbered patent requiring correction and that the said Letters Patent should read as corrected below.

Column 1, lines 30 to 39, the formula should appear as shown below instead of as in the patents:

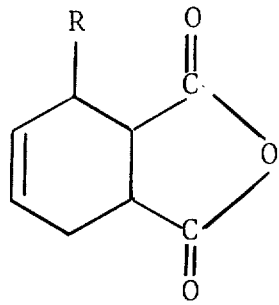

column 3, lines 23 to 30, the formula should appear as shown below instead of as in the patent:

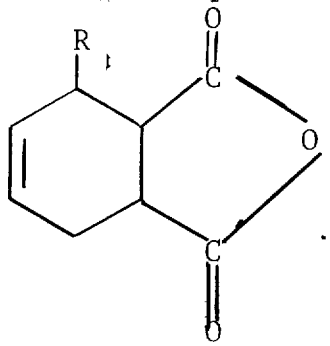

Signed and sealed this 26th day of September 1967.

(SEAL)
Attest:

ERNEST W. SWIDER                        EDWARD J. BRENNER
Attesting Officer                     Commissioner of Patents